(12) United States Patent
Haddadin et al.

(10) Patent No.: US 7,702,034 B1
(45) Date of Patent: Apr. 20, 2010

(54) PARALLEL PROCESSING FOR PROGRAMMABLE WIDEBAND DIGITAL MODULATION

(75) Inventors: Osama Sami Haddadin, Salt Lake City, UT (US); L. Andrew Gibson, Jr., Riverton, UT (US); David Scott Nelson, Salt Lake City, UT (US)

(73) Assignee: L3 Communications Corporation, New York, NY (US)

( * ) Notice: Subject to any disclaimer, the term of this patent is extended or adjusted under 35 U.S.C. 154(b) by 34 days.

(21) Appl. No.: 12/077,455

(22) Filed: Mar. 17, 2008

Related U.S. Application Data (62) Division of application No. 10/637,946, filed on Aug. 7, 2003, now Pat. No. 7,515,651.

(51) Int. Cl.
*H04L 27/20* (2006.01)
(52) U.S. Cl. .................................. 375/308; 332/103
(58) Field of Classification Search ............... 375/308, 375/298, 295; 455/118; 332/100, 103
See application file for complete search history.

(56) References Cited

U.S. PATENT DOCUMENTS

| | | | | |
|---|---|---|---|---|
| 3,971,996 | A * | 7/1976 | Motley et al. ............... | 327/233 |
| 5,812,608 | A | 9/1998 | Valimaki et al. ............ | 375/331 |
| 6,141,387 | A * | 10/2000 | Zhang ....................... | 375/261 |
| 6,724,335 | B1 * | 4/2004 | Gomez et al. ............... | 341/144 |
| 6,968,016 | B1 * | 11/2005 | Garg et al. ................. | 375/298 |
| 6,973,141 | B1 * | 12/2005 | Isaksen et al. .............. | 375/308 |

OTHER PUBLICATIONS

Fredric J. Harris, "Multirate Digital Filters for Symbol Timing Synchronization in Software Defined Radios", IEEE Journal on Selected Areas in Communications, vol. 19, No. 12, Dec. 2001, pp. 2346-2357.
Floyd M. Gardner, "Interpolation in Digital Modems-Part I: Fundamentals", IEEE Transactions on Communications, vol. 41, No. 3, Mar. 1993, pp. 501-507.
Lars Erup, "Interpolation in Digital Modems-Part II: Implementation and Performance", IEEE Transactions on Communications, vol. 41, No. 6, Jun. 1993, pp. 998-1008.

(Continued)

*Primary Examiner*—Temesghen Ghebretinsae
(74) *Attorney, Agent, or Firm*—Harrington & Smith (57) ABSTRACT

A circuit 30 for upsampling and upconverting a high rate signal that is divided into M in-phase (I) symbols and M quadrature (Q) symbols. A Nyquist filter 32 upsamples by a factor of k each of the 2M symbols in parallel during one system clock period (CP). The filter 32 has a plurality of 2kM filter components 40, 42, that each provides a continuous output. A plurality of multipliers 50, 52 each upconverts a filter component output with a carrier wave signal 46, 48 that is output from a numerically controlled oscillator 44. A plurality of adders 54 each adds the output of two multipliers 50 to recombine corresponding I and Q samples to output kM samples during a CP. For continuous phase modulation, N parallel bits are input into the filter 32, upsampled in one CP, and accumulated and modulated 82 in parallel in one CP. For analog processing, M (I) and M (Q) symbols are input into an FIR filter 77a, 77b for upsampling, and decimated at a MUX/DAC block 78 for subsequent analog upconversion.

4 Claims, 6 Drawing Sheets

OTHER PUBLICATIONS

Gabriel Watkins, "Optimal Farrow Coefficients for Symbol Timing Recovery", IEEE Communications Letters, vol. 5, No. 9, Sep. 2001, pp. 381-383.

V. Valimaki and T. I. Laakso, "Principles of Fractional Delay Filters", IEEE International Conference on Acoustics, Speech, and Signal Processing, Istanbul, Turkey, Jun. 2000, pp. 1-4.

* cited by examiner

PARALLEL PROCESSING FOR PROGRAMMABLE WIDEBAND DIGITAL MODULATION

PRIORITY STATEMENT

This application is a divisional of U.S. patent application Ser. No. 10/637,946 which was filed on Aug. 7, 2003 now U.S. Pat. No. 7,515,651, and claims benefit thereto under 35 U.S.C. §121.

TECHNICAL FIELD

These teachings relate generally to signal processing in wideband programmable digital modems, such as those used in software-defined radios. It is particularly related to parallel processing of an input data signal to upsample the input signal to achieve a data rate out of the circuit greater than or equal to the system clock rate.

BACKGROUND

There are a variety of competing modulation techniques for wideband communications, including, for example, Phase Shift Keying (PSK), Amplitude Shift Keying (ASK), Quadrature Amplitude Modulation (QAM), and variations of each, to name a few. There is an increasing need for communication transmitters and receivers that can process and code/decode more than one modulated waveform. For example, various U.S. Government agencies communicate using Common Data Link Class 1 category A and B waveforms, Terrestrial Line of Sight waveform, classified direct downlink waveform, numerous waveforms for civil and military communications with satellites and/or military assets, and the (to be determined) commercial teledesic waveform. Overlap between these agencies, and between arms of other governments or multinational corporations that communicate over numerous disparate systems, is beginning to drive a need for flexible-modulation hardware that can operate among various communications waveforms such as those above.

One approach in achieving the above hardware flexibility is a modem that is programmable for any particular modulation. Such a modem is termed a programmable digital modem, which forms a key component of software-defined radios. Two related components of such a modem are filters, especially pulse shaping filters that upsample an input signal during each symbol, and up-converters for converting the shaped signal from a baseband frequency to an intermediate frequency (IF). On the demodulate side, the reverse functions are required. Wideband programmable modems by necessity incorporate field programmable gated arrays (FPGAs) and/or digital signal processors (DSPs) as opposed to application specific integrated circuits (ASICs) that are typically used in modems dedicated to a particular modulation scheme. Clock speeds in FPGAs are generally slower than those in ASICs, so at least the first generation of software-defined radios are expected to operate at maximum clock speeds in the range of 100 to 300 MHz.

In general, a signal input into a modulator is up-sampled at some integer multiple of the symbol rate (the sampling frequency) for pulse shaping and up-conversion to an intermediate frequency (IF). Except for spread spectrum systems, pulse shaping is desirable to compress the bandwidth of data impulses without increasing intersymbol interference (ISI) inordinately. For most applications, proper pulse shaping requires three or four samples per symbol, and up-conversion occurs at the data rate output from the pulse-shaping filter.

Many prior art systems are designed to avoid intersymbol interference (ISI). For prior art systems wherein the sampling frequency is limited to the clock speed, then upsampling three times per symbol yields a symbol rate of about one third the clock speed. Considering the FPGA clock speeds noted above, this prior art limitation on data rate is unacceptable for wideband programmable modem applications. Software defined radios with low data rates are currently available. The present invention is directed to meeting the challenge of enabling high data rates for wideband programmable modems.

Figure 1:
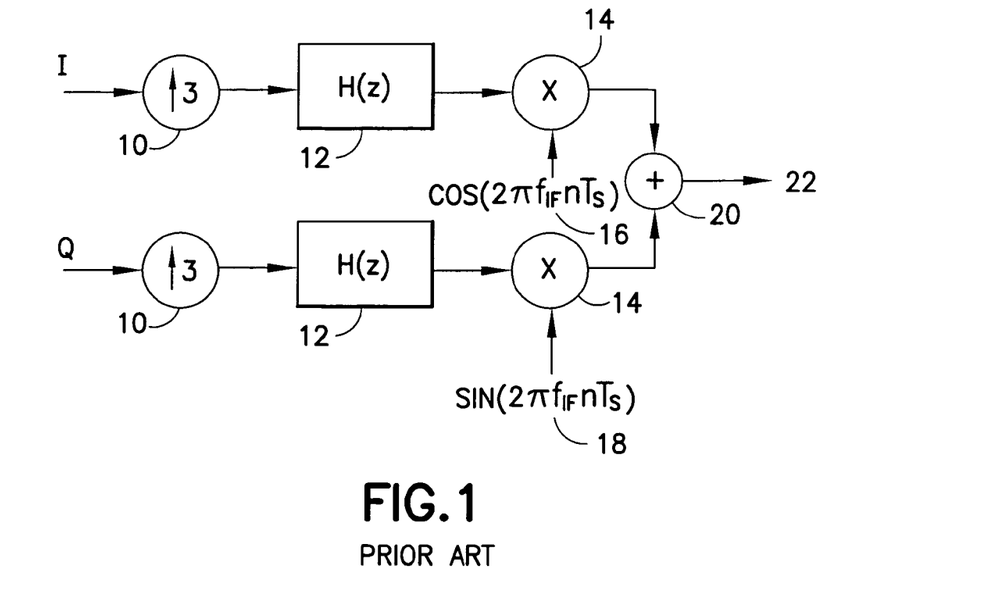
FIG. 1 is a block diagram showing conventional digital pulse shaping and digital up-conversion of a pulse sampled three times per symbol.
Figure 2:
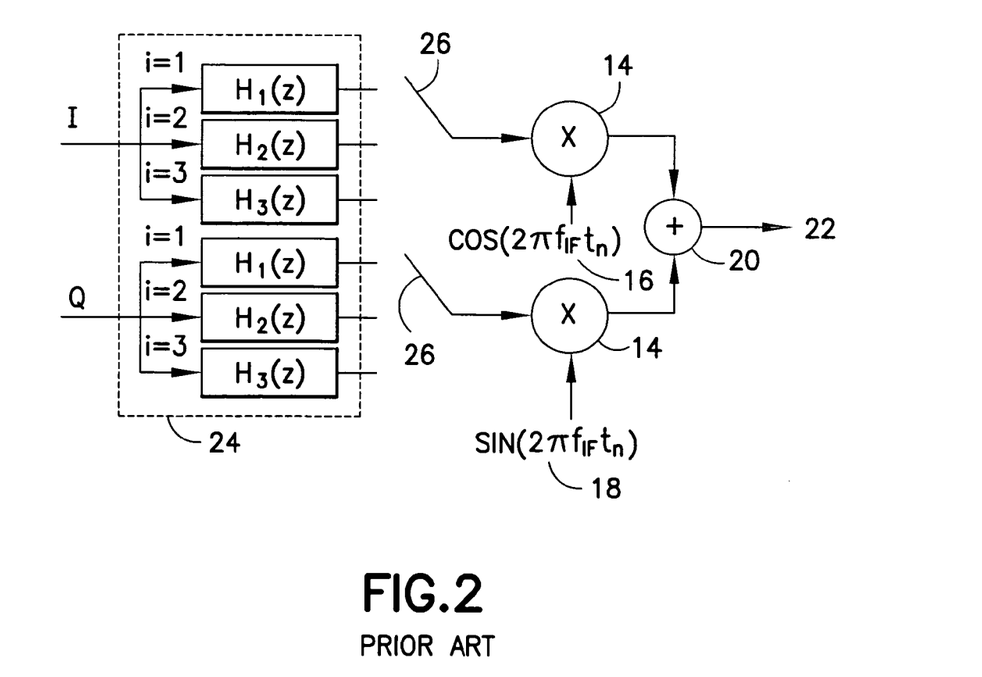
FIG. 2 is a block diagram of a conventional polyphase filter for sampling three times per symbol that may be used with the diagram of FIG. 1.

Prior art systems for sampling and up-conversion are shown generally in FIGS. 1 and 2. FIG. 1 is a block diagram showing an in-phase signal I, and a quadrature signal Q that is orthogonal to the in-phase signal. Each of the I and Q signals are up-sampled at three times the symbol rate in the embodiments of FIG. 1, producing 3 samples per symbol that are input into a digital pulse shaping filter 12, such as a Nyquist filter. The output of the filter 12 is at the same rate as its input, 3 samples per symbol. This output enters a multiplier 14, where the I signal is modulated onto an up-converted cosine signal 16 and the Q signal is modulated onto an up-converted sine signal 18. The term $f_{IF}$ is the up-converted frequency and the term $t_n$ is the $n^{th}$ sample equal to $nT_s$, where $T_s=1/f_s$ is the sampling period. The modulated orthogonal signals enter an adder 20 and are output as a combined digital signal 22, which is typically input into a digital to analog converter (DAC) and transmitted.

Assuming, for example, that a device system clock of FIG. 1 is running at $f_{clk}=200$ MHz, then the sample rate $f_s$ is limited to 200 Msps (million samples per second), and the symbol rate in the above example is limited to 200/3 million symbols per second. One drawback to the design of FIG. 1 is that the filter 12 has to run at the sample rate operating on the zeros inserted by the up-sampler 10. To eliminate this inefficiency, the prior art may employ a polyphase filter structure such as that shown in FIG. 2.

In the prior art circuit of FIG. 2, each I and Q input signal is split to enter a plurality i of polyphase components $H_i(z)$ [depicted as $H_1(z), H_2(z), H_3(z)$] of a polyphase filter 24. The depicted filter 24 up-samples by three and pulse shapes the complex signal, but not all polyphase components run at the same time. At any time instant n, only the $i^{th}$ polyphase component on each I and Q line is generating an output. At time n+1, the polyphase component with index (i+1) modulo 3 generates an output. The two portions of the gate 26 operate in tandem to select corresponding I and Q samples from the corresponding polyphase components $H_i(z)$. As with FIG. 1, the I and Q pulses each enter a multiplier 14, are modulated and up-converted on a cosine 16 and sine 18 carrier wave, and added at an adder 20 to produce a combined digital signal 22 for output to a multiplexer, digital to analog converter, or other circuitry. The architecture of FIG. 2 saves on multipliers as compared to FIG. 1, since each polyphase component $H_i(z)$ of the polyphase filter 24 is one-third the order of the pulse-shaping filter 12 of FIG. 1. Despite this computational efficiency, the circuit of FIG. 2 remains limited to a symbol rate of one-third the system clock (system clock divided by the up-sampling factor), just as the circuit of FIG. 1. In each of FIGS. 1 and 2, it is assumed that the sine and cosine functions are generated by a numerically controlled oscillator (not shown) running at the sample rate $f_s$.

SUMMARY OF THE PREFERRED EMBODIMENTS

The foregoing and other problems are overcome, and other advantages are realized, in accordance with the presently preferred embodiments of these teachings. One aspect of the present invention is a circuit for up-sampling a digital data stream. The circuit includes a system clock defining a clock period, a filter, an oscillator, multipliers (designated herein as in-phase and quadrature multipliers for clarity), and adders arranged as follows. The filter has as parallel inputs, during one clock period, M in-phase symbols and M quadrature symbols derived from a high rate data stream, wherein M is an integer greater than or equal to one. The filter outputs in parallel, during one system clock period, k samples from each symbol, wherein k is an integer greater than one. The oscillator outputs 2Mk carrier wave outputs, half of them first carrier wave outputs such as cosine wave signals and half of them second carrier wave outputs such as sine wave signals.

The in-phase multipliers number Mk, and each has two inputs: one coupled to a first carrier wave output of the oscillator and the other to an output of the filter corresponding to an in-phase symbol. Similarly, the quadrature multipliers number Mk, and each has two inputs: one coupled to a second carrier wave output of the oscillator and the other to an output of the filter corresponding to a quadrature symbol. Preferably, the adders number M. Each adder has two inputs: one coupled to an output of an in-phase multiplier and the other to an output of a quadrature multiplier.

The greatest output data rates are achieved with larger M, and the symbol rate out of the circuit can be M times the system clock rate. Pulse shaping at the transmitter may introduce intersymbol interference, which is intended to be removed at the receiver. Preferably, the filter is a polyphase Nyquist filter having a plurality of filter components providing a continuous output though that output does not necessarily include a sample during each clock period, and the oscillator is an NCO having k parallel registers storing N bits each, and the upconverting frequency $f_{IF}$ is scaled by $2^N/f_s$, wherein $f_s$ is the sampling frequency.

In another aspect of the invention, a circuit for upsampling a high rate data stream includes a system clock defining a clock period, a phase rotator sub-circuit, and a filter block. The phase rotator subcircuit takes a data stream input and outputs a plurality of M in-phase and M quadrature symbols in parallel during one clock period, M being an integer at least equal to one. The filter block has an input coupled to the output of the phase rotator sub-circuit, and upsamples each symbol by a factor of k during one clock period, k being an integer greater than one. Additional components such as those in the first-described aspect of the invention above may also be combined with this aspect. Alternatively, this aspect may be embodied in a more traditional analog arrangement, wherein the circuit further includes a multiplexer/digital-to-analog converter (MUX/DAC) block having an input coupled to the samples. The MUX/DAC decimates the samples, which are subsequently upconverted at an analog upconverter block that has an input coupled to an output of the MUX/DAC block. The filter block for this analog embodiment is a finite impulse response filter.

Yet another aspect of the present invention is a circuit particularly adapted for continuous phase modulation. This circuit includes a system clock defining a clock period, and upsampling pulse-shaping filter, an accumulator block, and a modulation block. The upsampling pulse shaping filter converts N bits input in parallel thereto during one clock period to kN samples that are output in parallel during one clock period, k being an integer greater than one. The accumulator block has an input coupled to the output of the filter. The modulation block has an input coupled to the output of the filter, and is for modulating the samples according to a continuous phase modulation technique. Preferably, the accumulator block and the modulator block are combined into one block.

Another aspect of the present invention is a method for digitally sampling and modulating a high rate data stream. The method includes dividing a high rate data input stream into either N bits or 2M symbols, depending upon the particular embodiment of the circuit used to sample and modulate. N is an integer greater than one and M is an integer at least equal to one. Where he input stream is divided into 2M symbols, M symbols are in-phase symbols and M symbols are quadrature symbols. The method further includes upsampling each of the bits or symbols by a factor of k in parallel during a single clock period to provide a continuous output that includes the samples, k being an integer greater than one. The method further includes upconverting and modulating at least some of the samples. For analog upconversion such as via the circuit described above using an FIR filter for upsampling, less than all samples are upconverted. For digital upconversion and modulation such as via the circuit described above using a Nyquist or pulse shaping upsampling filter for upsampling, typically all samples are upconverted and modulated.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

Figure 3:
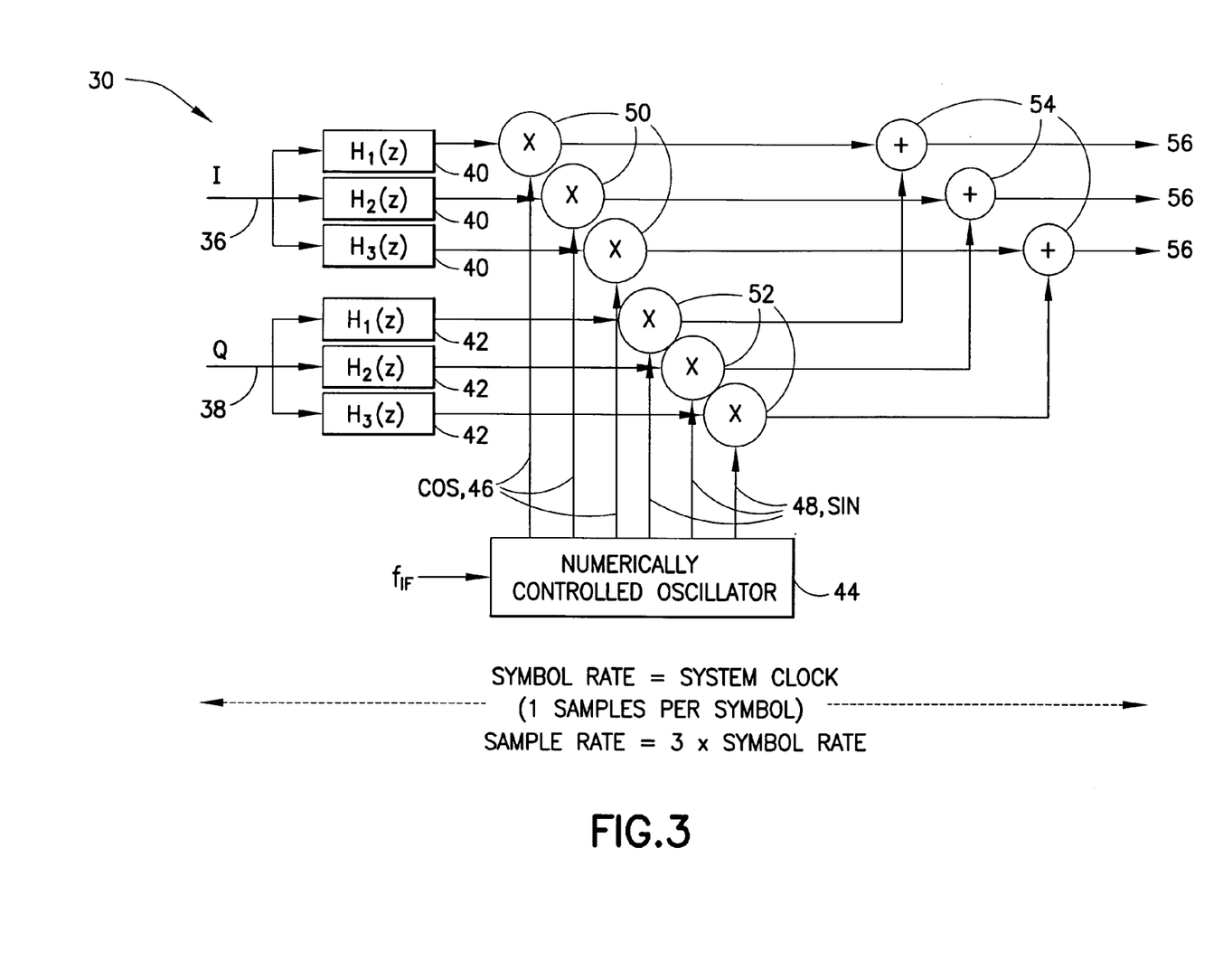
FIG. 3 is a block diagram depicting digital sampling and up-conversion of an I and Q input signal sampled at three times per symbol and processed in parallel, in accordance with the present invention.

The first embodiment of the present invention is depicted in block diagram form in FIG. 3. It is best understood in light of its end result: for FIG. 3, the symbol rate equals the system clock rate $f_{clk}$, and the sample rate $f_s$ exceeds the clock rate by the upsampling factor. As such, the data rate out of the circuit of FIG. 3 is triple (for an upsampling factor of three) the clock rate, or triple the rate of the prior art circuits described with reference to FIGS. 1 and 2. For the embodiment of FIG. 6, the data rate out is six times the clock rate because two symbols (one each on $I_1$ and $I_2$) are each upsampled in parallel by a factor of three during a single clock cycle (Q components not shown in FIG. 6).

Specifically, the circuit 30 of FIG. 3 depicts an in-phase signal I and a quadrature signal Q as inputs to an upsampling pulse-shaping filter 32, such as a polyphase Nyquist filter. The I and Q inputs are mapped from input bits as described below with reference to FIG. 5a. The I and Q signals are derived from an input data stream by means of a phase rotator that rotates the phase of a portion of the input data stream to be orthogonal to an unrotated portion, such as is known in the art using a phase rotator sub-circuit (not shown), for example. These I and Q signals are then processed in parallel through the circuit of the present invention, and preferably re-combined prior to transmission.

The upsampling pulse-shaping filter 32 includes k in-phase filter components 40 and k quadrature filter components 42. The number of polyphase filter components k, and hence the upsampling factor, can be any integer greater than one to realize the advantages of the present invention. Each $k^{th}$ component 40, 42 manipulates a pulse sampled from an I input 36 or a Q input 38 of the baseband signal according to a transfer function $H_k(z)$, wherein k={1, 2, 3} in FIG. 3. Each $k^{th}$ filter component 40, 42 samples once within a symbol, and corresponding $k^{th}$ in-phase and quadrature filter components 40, 42 sample their respective signals at the same $i^{th}$ time. Thus for a sample rate of three samples per symbol, there are three in-phase filter components 40 sampling at times $t_1$, $t_2$ and $t_3$ within a symbol; and three corresponding quadrature filter components 42 sampling at the same times $t_1$, $t_2$ and $t_3$ within the symbol. Unlike the prior art polyphase filter described with reference to FIG. 2, the filter components 40, 42 of the present invention all run simultaneously and each provides a continuous digital output.

An oscillator, preferably a numerically controlled oscillator (NCO) 44, uses an input frequency $f_{IR}$ that is above baseband to up-convert the baseband signal either to an intermediate frequency or to some center frequency that is limited by DAC speed and performance. While the description herein uses the conversion from baseband to IF as an example that is readily referenced by those skilled in the art, the present invention may be employed to convert directly from baseband to RF assuming other components of a programmable modem are compatible.

The NCO 44 is described in more detail below in reference to FIGS. 4a and 4b. In short, the NCO 44 takes as input a frequency $f_{IF}$ above baseband, and outputs a plurality of modulating signals, of which half of the NCO outputs are orthogonal to the other half of the NCO outputs. Orthogonal as used herein means a quadrature relationship. Preferably, the NCO 44 outputs a plurality of k cosine signals 46 and a plurality of k sine signals 48. It is an inconsequential equivalent for the outputs of the NCO 44 to be offset versions of cosine signals 46 and/or sine signals 48. These output signals 46, 48 are up-converted by the input frequency $f_{IF}$, and each $k^{th}$ cosine signal 46 representing the $i^{th}$ time has a corresponding $k^{th}$ sine signal 48 representing the same $i^{th}$ time. Preferably, the cosine signals 46 represent $\cos(2\pi f_{IF} t_i)$ and the sine signals 48 represent $\sin(2\pi f_{IF} t_i)$, wherein $t_i$ is the sample time i within a symbol. The times $t_i$ on which the output signals 46, 48 of the NCO 44 are based correspond to the $i^{th}$ time within a symbol at which the $k^{th}$ filter component 40, 42 samples within the symbol.

Each output of an in-phase filter component 40 is multiplied with one output of the NCO 44 at an in-phase multiplier 50. Similarly, each output of a quadrature filter component 42 is multiplied with one output of the NCO 44 at a quadrature multiplier 52. Preferably, the output of the NCO 44 that is inputted into an in-phase multiplier 50 is a cosine signal 46, and the output of the NCO 44 that is input into a quadrature multiplier 52 is a sine signal 48. The designations in-phase multiplier 50 and quadrature multiplier 52 are for clarity and do not indicate differing functionality. The output of each in-phase multiplier 50 is then an up-converted sample taken at an $i^{th}$ time within a symbol modulated on a cosine signal 46, and the output of each quadrature multiplier 52 is then an up-converted sample taken at an $i^{th}$ time within a symbol modulated on a sine signal 48 that is orthogonal to the cosine signal 46 for the same $i^{th}$ time.

The output of each in-phase multiplier 50 is joined with the output of a corresponding quadrature multiplier 52 at an adder 54. Corresponding multiplier outputs are those taken at the same sample time $t_i$, so the output of each adder is two samples each taken at time $t_i$ and modulated and up-converted on orthogonal signals 46, 48 for the same time $t_i$. The output of each adder 54 is a digital output signal 56 that may be combined into one high rate data stream and additionally processed, such as by a DAC equalization filter or predistortion filter followed by a digital to analog converter, an external multiplexer (Mux) or a MuxDAC. The three samples of FIG. 3, at times $t_1$, $t_2$, and $t_3$ within each symbol, are up-converted concurrently.

Figure 4A:
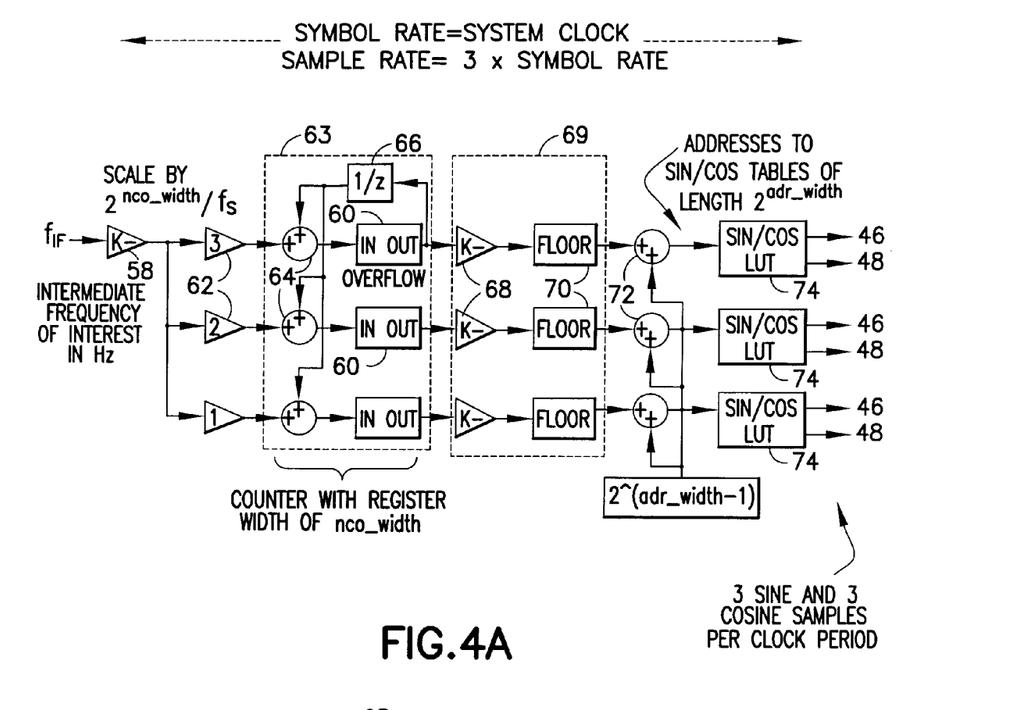
FIG. 4a is a block diagram of a numerically controlled oscillator that may be used for providing parallel modulating signals to the embodiment of FIG. 3 in accordance with the present invention.

FIG. 4a is a block circuit diagram representing an NCO 44 that may be used in the circuit of FIG. 3. The NCO 44 is controlled by a system clock (not shown) running at $f_{clk}$. A frequency signal or control word, denoted $f_{IF}$, is input into the NCO 44 and divided by an integer K at an inverter 58 and scaled by a scaling constant equal to $2^N/f_s$, wherein N is a number of bits stored in a shift register 60 to be described, and $f_s$ is the sampling rate of M samples/second. A frequency correction $\Delta f$ may be added to the control word at a pre-adder (not shown). The scaled control word is split into k signal paths and scaled or multiplied by a corresponding k value (k=1, 2 or 3 as shown) at a multiplier 62. Each multiplier 62 holds a new control word each clock cycle $f_{clk}$, which is input into an accumulator 63 that comprises an adder 64, a shift register 60, and a feedback loop 66. The output of the multiplier 62 passes through the N-bit adder 64, and then into the shift register 60 that stores N bits and that includes overflow circuitry. At each clock cycle, the value from the multiplier 62 is entered into the corresponding shift register 60, and the new value is stored therein (and latched back via a feedback loop 66 with a complement of the last stage). Driving the input of the shift register 60 with the complement of the last stage of the shift register 60 yields a Johnson counter which goes through $2^N$ states (in general, for a shift register holding N bits). For example, where N=3, the shift register 60 goes through 8 states and yields a 4-level approximation of a sine (or cosine) wave with a frequency of $\frac{1}{8}^{th}$ of the clock speed $f_{clk}$. Latch back occurs in parallel for each of the k signal paths.

Figure 4B:
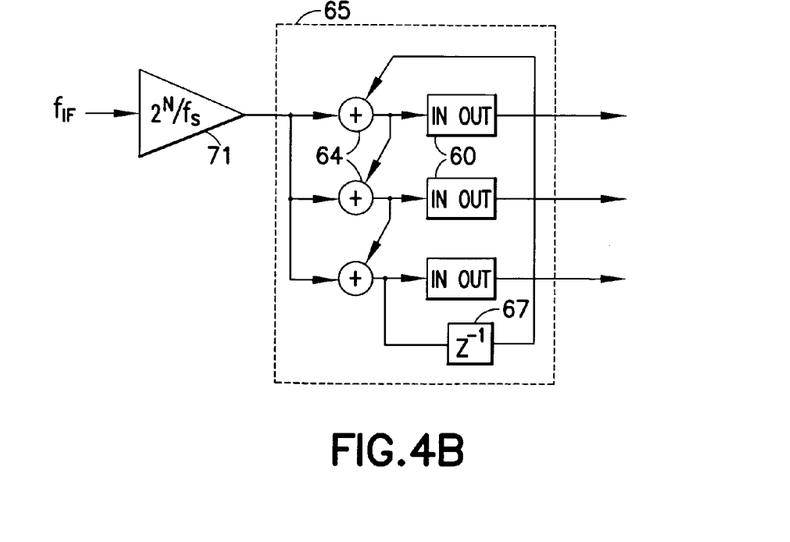
FIG. 4b is a block diagram showing an alternative embodiment of the first portion of the NCO of FIG. 4b.

An alternative embodiment to the above "front-end" portion of the NCO 44 (from the inverter 58 through the accumulator 63, inclusive) is shown in FIG. 4*b*, wherein an input intermediate frequency $f_{IF}$ is scaled at a scaling multiplier 71 by a factor of $2^N/f_s$, as detailed above, and then input into an alternate accumulator 65. The alternate accumulator 65 uses an adder 64 and shift register 60 on each parallel line, but the alternate feedback loop 67 is a wrap-around type wherein the input to a shift register 60 is tapped, inverted, and fed back into all of the adders 60 as opposed to the output of a shift register 60 in the accumulator 63 of FIG. 4*a*. For either embodiment of the accumulator 63, 65 of either FIG. 4*a* or 4*b*, the width N of the shift registers 60 is the same.

The output of each shift register 60 passes through a truncating circuit 69 that includes a divider 68 and an integer filter 70. Where the width of an address in a lookup table 74 (described below) is Y bits, the truncating circuit 69 maps the output of each shift register 60 to integer values between $-[2^{(Y-1)}]$ and $+[2^{(Y-1)}-1]$. Each divider 68 divides the output of its corresponding shift register 60 by the same scaling factor k that was used in the corresponding multiplier 62 to remove effects therefrom. The integer filter 70 rounds down to the nearest integer. An input of N bits into the truncating circuit yields an output of Y bits, which is the width of the address for a lookup table (LUT) 74. The output of the truncating circuit 69 is scaled by a factor of $2^{(Y-1)}$ at a scaling adder 72. The output of the scaling adder 72 for each k signal path is then an address of length $2^Y$ that is used to access a lookup table 74 for the corresponding cosine and sine values for the $i^{th}$ time; $\cos(2\pi f_{IF} t_i)$ and sine $(2\pi f_{IF} t_i)$, which are the cosine and sine signals 46 and 48, respectively. For the example of FIG. 4, the NCO 44 provides k=3 cosine signals 46 and k=3 sine signals 48 for each clock period $f_{clk}$. As described with reference to FIG. 3, each cosine signal 46 from the LUT 74 is input into an in-phase multiplier 50, and each sine signal 48 from the LUT 74 is input into a quadrature multiplier 52. The NCO 44 may be expanded or contracted for any number of signal paths k to match the number of samples per symbol taken at the upsampling pulse-shaping filter 32.

Figure 5A:
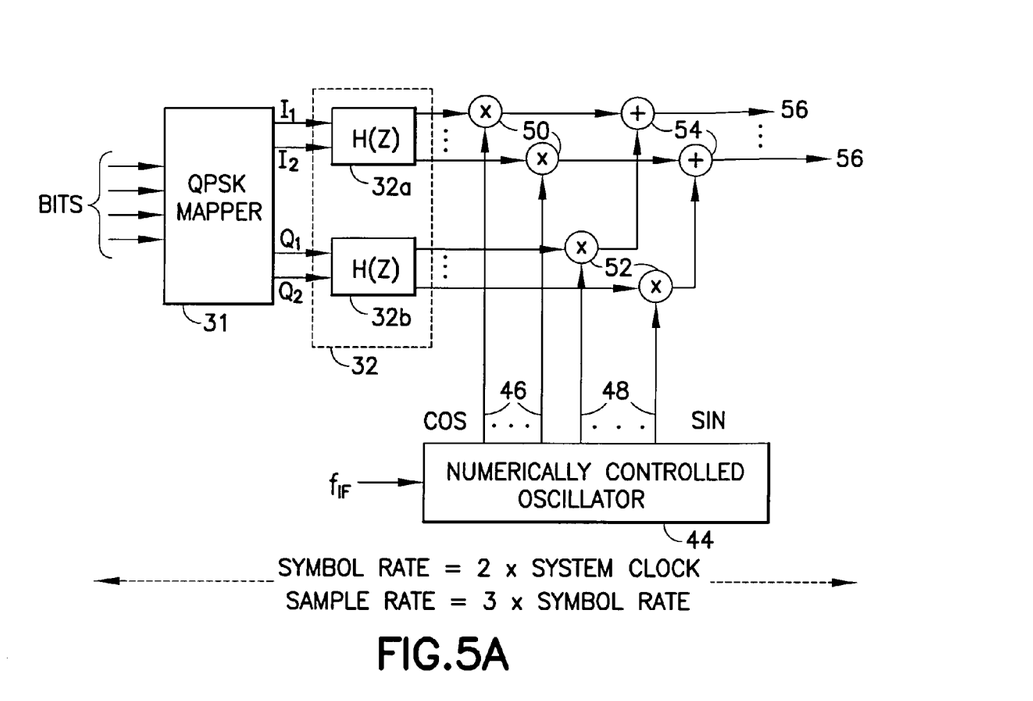
FIG. 5a is a block diagram depicting bit mapping, digital sampling and up-conversion for a plurality of parallel I and Q signals, processed in parallel in accordance with the present invention.
Figure 6:
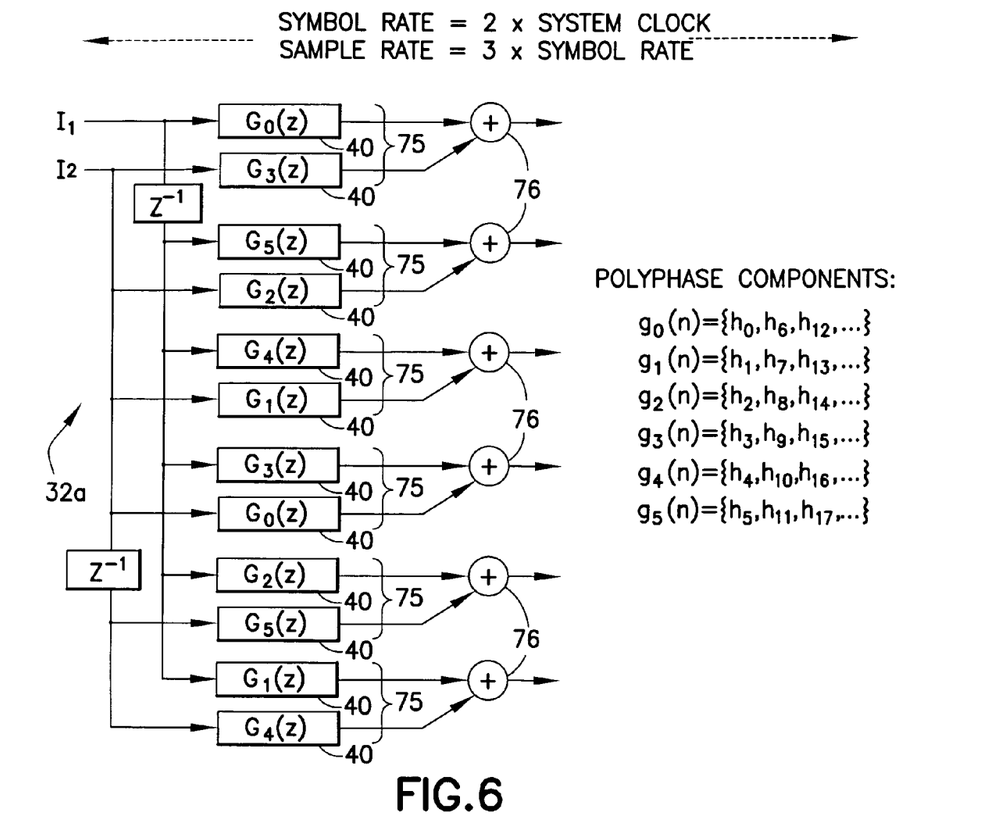
FIG. 6 is a block diagram depicting a six-component polyphase filter for parallel sampling of two I signals at six times per two symbols.

FIG. 3 shows an embodiment of the present invention wherein the symbol rate equals the clock rate. However, higher processing speeds are readily enabled by the architecture disclosed herein. FIG. 5*a* is a block diagram depicting parallel up-conversion of a plurality of I and Q lines. Input bits are fed into a mapper 31 such as a QPSK mapper shown, which uses a lookup table or algorithm to output a series of M in-phase signals and M quadrature signals, M being an integer greater than zero. The input bits are typically input into a modem embodying the present invention as a single high data rate input stream. Circuitry within the modem then divides the high rate serial input into parallel data streams, as known in the art, to enable parallel processing as described herein. The parallel I and Q signals shown in FIGS. 5*a* and 6 derive from a very high speed data link input into the modem, such as from a single source or a combination of sources (video, data, multiple phone lines, etc.) that are combined into a single stream of input bits. Prior to modulation, the input bits are mapped into symbols to generate M symbols per clock cycle. In the embodiment of FIGS. 5*a* and 6, M=2. During each clock cycle, one symbol is input into the upsampling pulse shaping filter in-phase block 32*a* on line $I_1$ and another symbol is input thereto on the line $I_2$. Similar processing occurs for $Q_1$ and $Q_2$. Each of the two symbols (in a single clock period) represents different phases of the same signal originally input to the modem.

Figure 5B:
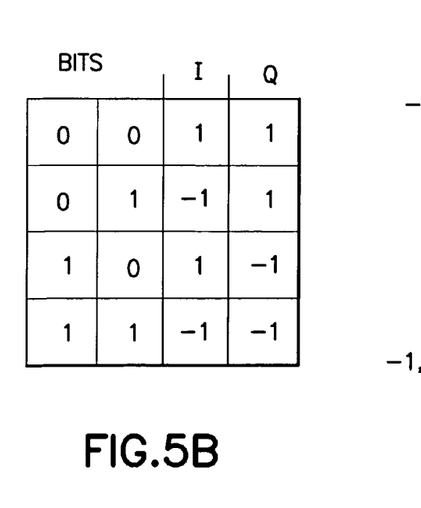
FIG. 5b is a sample QPSK lookup table for bit mapping.
Figure 5C:
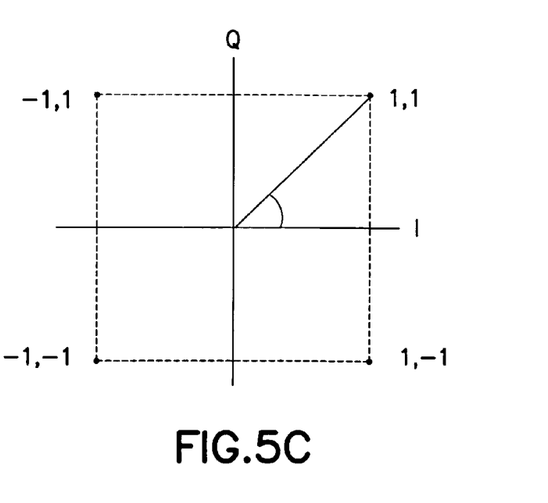
FIG. 5c is an I-Q constellation for the table of FIG. 5b.

FIG. 5*b* is a table of bit mapping for QPSK, and FIG. 5*c* is a QPSK symbol constellation corresponding to the table of FIG. 5*b*. FIG. 3 depicts the specific case of M=1, one symbol processed per clock period (and one pair of orthogonal signals I and Q). For processing more than one symbol per clock period (M>1), operation is similar to that described with reference to FIG. 3, except that the upsampling pulse shaping filter 32 upsamples and shapes a plurality of symbols in parallel. For the example of FIG. 5*a* wherein M=2, during a single clock period, $I_1$ and $I_2$ each input a symbol (as do $Q_1$ and $Q_2$) into the upsampling pulse shaping filter 32. Assuming the same upsampling factor of three samples per symbol (k=3) previously used for illustration, there are then six (M*k) digital output signals 56 that may preferably be combined into a high rate data stream for multiplexing and analog conversion prior to transmission.

Figure 8:
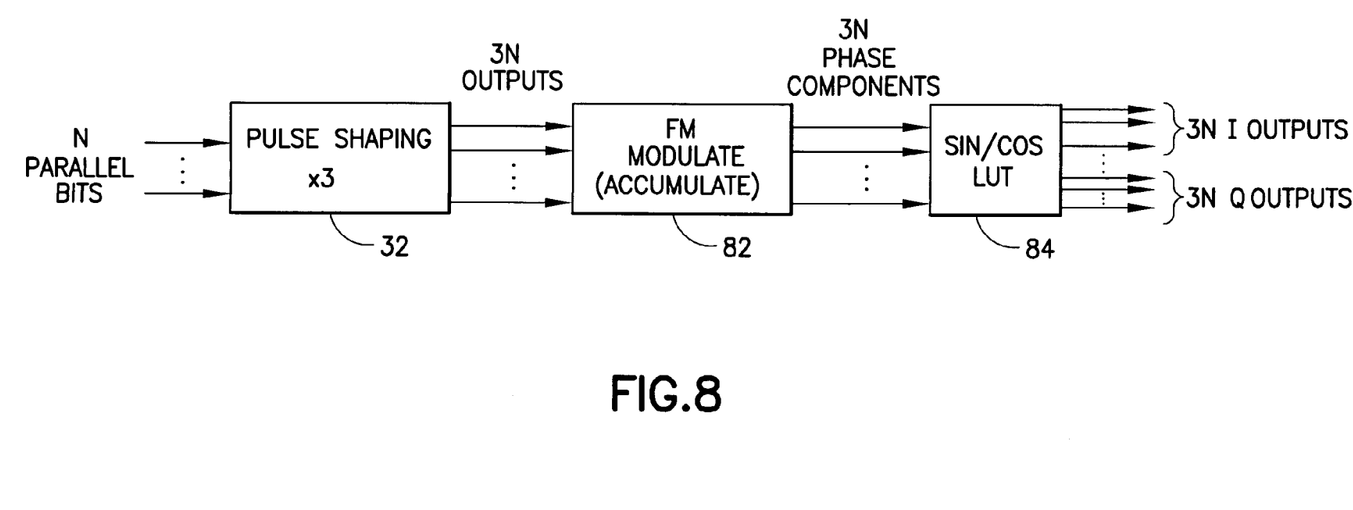
FIG. 8 is a high-level block diagram showing the present invention adapted for CPM modulation such as GMSK or MSK.

FIG. 5*a* also shows digital up-conversion in parallel. Samples from the symbols on $I_1$ and $I_2$ are multiplied by cosine signals 46, and samples from the symbols on $Q_1$ and $Q_2$ are multiplied by sine signals 48. There are M*k cosine and M*k sine signals 46, 48 each clock period to match the outputs of the upsampling pulse shaping filter blocks 32*a*, 32*b*. The sine and cosine signals 46, 48 are generated using a numerically controlled oscillator 44 as described. This structure is best suited for PSK and QAM type modulators. Parallel processing allows for an increase in symbol rates (M>1), and therefore, bit rates. An extension of this structure such as shown in FIG. 8 allows the digital modulation of continuous-phase modulation (CPM) class of modulation techniques (i.e., GMSK, PGMSK, MSK).

One substantive difference between processing for M=1 symbols per clock period as in FIG. 3, and processing for M>1 as in FIG. 5*a*, lies in the upsampling pulse shaping filter 32. In accordance with the preferred embodiment of the present invention, the number of in-phase or quadrature filter components is equal to the product of the upsampling factor k and twice the square of the number of symbols per clock period M being processed. Specifically, there are $M^2 k$ filter components for the I signals and $M^2 k$ filter components for the Q signals, yielding $2M^2 k$ filter components in total. In the example of three samples per symbol (k=3) and two symbols per clock period (M=2), the upsampling pulse-shaping filter 32 would preferably comprise $3*2^2=12$ in-phase filter components 40 and an additional twelve quadrature filter components 42. Where there are four samples per symbol (k=4) and three symbols per clock period (M=3), the upsampling pulse-shaping filter 32 would preferably comprise thirty-six in-phase and thirty-six quadrature filter components.

As M (or possibly k) grows larger for faster processing, prior art approaches would become limited by ISI. The present invention does not seek to avoid or minimize ISI by dividing symbols into ever smaller time divisions, but rather allows ISI to be introduced at the modulating side of a modem to be removed at the demodulating side after transmission and reception. Preferably, ISI introduced by the processing described herein is removed by a root raised cosine matched filter in the demodulator.

FIG. 6 is a block diagram depicting two symbols per clock period (one each on $I_1$ and $I_2$) input into twelve filter components 40 of an in-phase block 32*a* of an upsampling pulse shaping filter that may be used in the embodiment of FIG. 5, where M=2 and k=3. Each of the two symbols (in a single clock period) represents different phases of the same signal originally input to the modem. Each of the in-phase filter components 40 run at the same time and operate on all inputs at the same time. Each filter component 40 outputs one sample per symbol that is input thereto, but for M>1, not all symbols are input into every polyphase filter component 40. Filter components 40 are arranged in sub-groups 75 (e.g., $G_0(z)$ is grouped with $G_3(z)$; $G_5(z)$ with $G_2(z)$, etc.) such that each sub-group 75 draws one sample in one clock period from each of the M symbols processed per clock period. Consequently, within each sub-group 75 and within each clock period, each filter component 40 draws one sample from a symbol that is not sampled by any other filter component 40 within that same sub-group 75. The size of a sub-group is then M. As shown in FIG. 6, sub-groups 75 of filter components 40 have their outputs joined at a filter adder 76. The outputs of the six filter adders 76 of FIG. 6 are six samples that span two symbols (one each from $I_1$ and $I_2$). Though spanning two symbols, the outputs of the six filter adders 76 occur over a single clock period. The output of each filter adder 76 is then input into an in-phase multiplier 50 (see FIGS. 3 and 5) and processed as described with reference to FIG. 3.

All of the filter components 40, such as those depicted in FIG. 6, operate at the same time producing one sample per clock period. At each clock period, one sample is clocked into and one sample is clocked out of each filter component 40. The processing of multiple inputs occurs simultaneously to enable the high sample rates detailed herein. The outputs from each of the sub-groups 75 are added together at the respective filter adder 76, and the six outputs shown in FIG. 6 are later added into one sample.

For example, assume a four-tap filter with filter coefficients $h_1$, $h_2$, $h_3$, and $h_4$ operating on input samples $I_1$, $I_2$, $I_3$, and $I_4$. At some instant, the output will be $y=(h_1+I_1)+(h_2+I_2)+(h_3+I_3)+(h_4+I_4)$. The filter has memory of four samples or four clock periods. Thus, at some instant it will have all four input samples and generate the output y. Now assume that the four-tap filter is divided into two filter (polyphase) components 40 such that the first filter component has coefficients $h_1$ and $h_3$ and the second filter component has coefficients $h_2$ and $h_4$. Assume also that the inputs are split into parallel paths such that $I_1$ and $I_3$ are input into the first filter component and $I_2$ and $I_4$ are input into the second filter component. The output of the first filter component is $y_1=(h_1+I_1)+(h_3+I_3)$, and the output of the second filter component is $y_2=(h_2+I_2)+(h_4+I_4)$. The outputs $y_1$ and $y_2$ of the filter components are independently generated, and are added at a filter adder 76 to output the sample $y=y_1+y_2$, which is mathematically the same as the four tap filter described above. However, the parallel implementation described allows a faster data rate than the four-tap filter.

Referring to the polyphase filter components 40 of FIG. 6, $G_k(z)$ is the z domain transform of the $k^{th}$ filter component $g_k(n)$, wherein z represents the z domain and n represents the time domain. For example, using the notation of FIG. 6, $G_0(z)=Z\{g_0(n)\}$, wherein $Z\{.\}$ represents the z-transform. The output of any $i^{th}$ filter component 40 given an input $x(n)$ is then $$y(n) = \sum_{k=0}^{M-1} g_i(k)x(n-k).$$

Each of the filter components 40 are polyphase components generated from the original $G(z)$ polyphase filter, wherein $G(z)=\{G_0(z), G_1(z), \text{etc.}\}$.

Similar processing occurs on the associated Q input signals, and the NCO 44 is expanded and adapted to provide cosine signals 46 and sine signals 48 to the various multipliers 50, 52. For the embodiment of FIG. 5a wherein M=2 and k=3, the circuit of the present invention yields six up-converted output signals 56 that span two symbols, and which may then be multiplexed and transmitted at a data rate substantially higher than that attainable by previous known methods or circuits. Specifically, the embodiment of FIG. 5a yields a symbol rate that is twice the system clock rate and a sample rate that is six times the clock rate. The embodiment of FIG. 5a can be readily extended to M>2 as previously noted.

Figure 7:
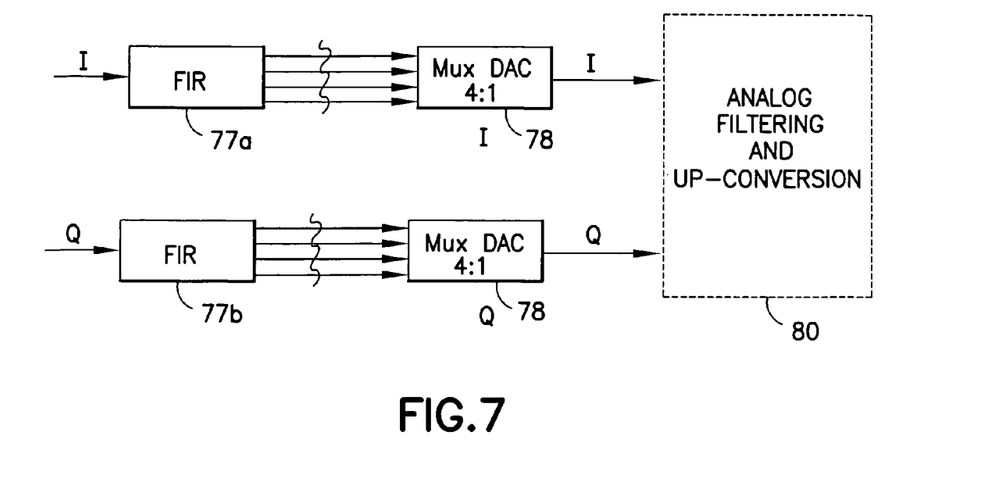
FIG. 7 is a block diagram showing parallel pulse-shaping filters used in a circuit wherein up-conversion to RF is via analog circuitry.

FIG. 7 is a block diagram showing integration of the present invention with more traditional modulation in which up-conversion to RF is accomplished by analog circuitry. The I and Q inputs are each processed by a finite impulse response (FIR) filter 77a, 77b, such as any of the various FIR implementations (tapped delay or direct structure, transposed structure, lattice, etc.) known in the art. The traditional FIR filter 77a, 77b in the embodiment of FIG. 7 is mathematically equivalent to the polyphase filter (upsampling and pulse shaping filter 32) described above with reference to FIGS. 3-6. However, embodiments including the polyphase filter are preferred to those with the FIR filter for increased data rates, because polyphase filters employ buffers to spread computations over all available times. In this way, pulse shaping filters span multiple symbols whereas FIR filters use old input samples in computing a current output.

In the embodiment of FIG. 7, each FIR filter 77a, 77b outputs four samples per symbol on each of the I and Q input lines to a multiplexer/digital to analog converter (MUX/DAC) 78, which decimates to one I and one Q output that are further processed via analog filtering and upconversion 80 as known in the art.

FIG. 8 shows application of the present invention to continuous phase modulation (CPM) techniques such as GMSK and MSK. N parallel bits, derived from a high-rate data source, are input per clock period into an upsampling and pulse shaping filter 32 as previously described. Assuming an upsampling factor of three, there are 3N outputs from the upsampling and pulse-shaping filter 32. These 3N outputs are accumulated and modulated at an FM modulating block 82 where they are converted to 3N phase component outputs, which are input into a sine/cosine lookup table block 84 similar to the LUT 74 previously described, except that the output of the LUT block 84 is 3N in-phase outputs and 3N quadrature outputs from only a total of 3N inputs. These I and Q outputs can be upconverted to intermediate frequency in a digital domain system, or sent to a DAC and then converted in an analog domain system.

The present invention may also include parallel fractional interpolators disposed between the upsampling pulse-shaping filter blocks 32a, 32b of FIG. 5a (or polyphase filter components 40, 42 of FIG. 3) and the multipliers 50, 52. Such fractional interpolators are preferably controlled by a separate NCO in an arrangement described in co-assigned U.S. patent application Ser. No. 10/690,898 (now U.S. Pat. No. 7,340,024), entitled "Parallel Fractional Interpolator with Data Rate Clock Synchronization". The arrangement of a preferred embodiment of the present invention, in combination with parallel fractional interpolators and associated circuitry as described above, is illustrated at FIG. 1 of the referenced application. Such parallel fractional interpolators may also be incorporated in the alternative embodiments disclosed herein in substantially the same manner.

While described in the context of presently preferred embodiments, those skilled in the art should appreciate that various modifications of and alterations to the foregoing embodiments can be made, and that all such modifications and alterations remain within the scope of this invention. Examples herein are stipulated as illustrative and not exhaustive.

What is claimed is:

1. A circuit for upsampling a high rate data stream comprising:
   a system clock defining a clock period;
   an upsampling pulse shaping filter for converting N bits input in parallel thereto during one clock period to an output of kN samples that are output in parallel during one clock period, wherein k is an integer greater than one;
   an accumulator block having an input coupled to the output of the filter; and
   a modulation block, having an input coupled to the output of the filter, for modulating the samples according to a continuous phase modulation technique and for outputting the modulated samples on kN parallel in-phase streams and on kN parallel quadrature streams.

2. A method for digitally sampling and modulating a high rate data stream comprising:
   dividing a high rate data stream into N bits, wherein N is an integer greater than one;
   upsampling each of the bits by a factor of k in parallel during a single clock period to provide a continuous output that includes the samples;
   upconverting and modulating at least some of the samples by accumulating and modulating the samples according to a continuous phase modulation technique to output kN phase components that are then converted to kN in-phase and kN quadrature outputs for upconversion.

3. The method of claim 2 wherein upsampling is by the polyphase Nyquist filter and upconverting occurs on all samples using a numerically controlled oscillator.

4. The method of claim 2 wherein upsampling is by the FIR filter, and wherein upconverting and modulating comprises decimating, multiplexing, and converting to analog less than all samples, outputting analog samples that are in-phase and quadrature versions of a converted sample, and upconverting the analog samples.

* * * * *